(12) United States Patent
Wang et al.

(10) Patent No.: US 10,718,067 B1
(45) Date of Patent: Jul. 21, 2020

(54) MAGNETIC STRANDS FOR FABRIC ITEMS

(71) Applicant: Apple Inc., Cupertino, CA (US)

(72) Inventors: Liming Wang, Windham, NH (US); Hao Zhu, San Jose, CA (US); Rimple Bhatia, Woodside, CA (US)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 15/655,740

(22) Filed: Jul. 20, 2017

Related U.S. Application Data

(60) Provisional application No. 62/381,991, filed on Aug. 31, 2016.

(51) Int. Cl.

| | |
|---|---|
| *D01D 5/34* | (2006.01) |
| *H01F 1/053* | (2006.01) |
| *D01D 5/08* | (2006.01) |
| *D02G 3/04* | (2006.01) |
| *D02G 3/44* | (2006.01) |
| *D03D 15/00* | (2006.01) |

(52) U.S. Cl.
CPC .......... *D01D 5/34* (2013.01); *D01D 5/08* (2013.01); *D02G 3/04* (2013.01); *D02G 3/44* (2013.01); *D03D 15/0055* (2013.01); *H01F 1/053* (2013.01)

(58) Field of Classification Search
CPC ........ D01D 5/34; D01D 5/08; D03D 15/0055; D02G 3/44; D02G 3/04; H01F 1/053
See application file for complete search history.

(56) References Cited

U.S. PATENT DOCUMENTS

| | | | |
|---|---|---|---|
| 3,882,667 A | | 5/1975 | Barry et al. |
| 4,435,465 A | | 3/1984 | Ebneth et al. |
| 4,471,015 A | | 9/1984 | Ebneth et al. |
| 4,803,094 A | | 2/1989 | Myers |
| 5,171,419 A | | 12/1992 | Wheeler et al. |
| 5,298,322 A | | 3/1994 | Hennecken et al. |
| 5,532,052 A | | 7/1996 | Eng et al. |
| 5,682,653 A | | 11/1997 | Berglof et al. |
| 5,914,076 A | * | 6/1999 | Schloss ............... D01F 1/10 264/103 |
| 6,050,931 A | | 4/2000 | Russell et al. |
| 6,162,539 A | * | 12/2000 | Shimizu ............... C09K 11/025 264/172.15 |

(Continued)

*Primary Examiner* — Galen H Hauth
(74) *Attorney, Agent, or Firm* — Treyz Law Group, P.C.; Kendall W. Abbasi

(57) ABSTRACT

Items such as fabric-based items may include magnetic strands. Magnetic strands may be formed using extrusion equipment. To form single component magnetic strands, first and second feed hoppers may respectively feed a base polymer and a magnet masterbatch to an extruder. The magnet masterbatch may include particles of a rare-earth alloy or other magnetic materials in a polymer blend. The extruder may push the base polymer and magnet masterbatch through a spinneret. To form bicomponent magnetic strands, a first extruder may push a base polymer and magnet masterbatch through a first set of openings in a spinneret, while a second extruder may push an additional polymer through a second set of openings in the spinneret. Bicomponent magnetic strands may have a magnetic core and non-magnetic sheath, may have a non-magnetic core and magnetic sheath, or may have other suitable configurations.

19 Claims, 8 Drawing Sheets

(56) References Cited

U.S. PATENT DOCUMENTS

| | | | |
|---|---|---|---|
| 6,274,519 B1 | 8/2001 | Omori et al. | |
| 2003/0122107 A1* | 7/2003 | Pourdeyhimi | D02G 3/346 |
| | | | 252/301.36 |
| 2007/0003761 A1* | 1/2007 | Miyazono | D01F 1/10 |
| | | | 428/375 |
| 2015/0240385 A1* | 8/2015 | Hahm | D01D 5/30 |
| | | | 428/373 |
| 2016/0024699 A1* | 1/2016 | Aldridge | G01V 3/38 |
| | | | 442/337 |

* cited by examiner

MAGNETIC STRANDS FOR FABRIC ITEMS

This application claims the benefit of provisional patent application No. 62/381,991, filed Aug. 31, 2016, which is hereby incorporated by reference herein in its entirety.

FIELD

This relates generally to magnetic materials, and more particularly, to items that include magnetic materials.

BACKGROUND

Magnetic material is used to form components such as permanent magnets and soft magnetic materials. Magnetic materials may be difficult to incorporate into certain items such as fabric-based items and other items without creating undesirable visible and tactile artifacts. If care is not taken, the items into which permanent magnets and other magnetic structures are incorporated may be overly bulky, stiff, or unsightly.

SUMMARY

Items such as electronic devices, fabric-based items, and other items may include strands of magnetic material. Magnetic material may be used in forming clasps, closures for seams in fabric-based items, flaps and other structures with positions that may be sensed using magnetic sensors, and other structures.

Magnetic strands may include magnetic material formed from particles of a rare-earth alloy or other magnetic particles in a polymer blend. Magnetic strands may be formed using extrusion equipment.

Strands of magnetic material may be single component magnetic strands that are formed using one extruder or may be bicomponent magnetic strands that are formed using two extruders. A single component magnetic strand may include magnetic particles in a polymer blend. A bicomponent magnetic strand may include a magnetic cores surrounded by a non-magnetic sheath or may have a non-magnetic core surrounded by a magnetic sheath.

To form single component magnetic strands, first and second feed hoppers may respectively feed a base polymer and a magnet masterbatch to an extruder. The magnet masterbatch may include particles of a rare-earth alloy or other magnetic materials in a polymer blend. The extruder may push the base polymer and magnet masterbatch through a spinneret.

To form bicomponent magnetic strands, a first extruder may push a base polymer and magnet masterbatch through a first set of openings in a spinneret, while a second extruder may push an additional polymer through a second set of openings in the spinneret. Bicomponent magnetic strands may have a core-and-sheath type shape or may have other suitable configurations depending on the shape, size, and arrangement of openings in the spinneret.

If desired, the rate at which the magnet masterbatch that is fed to the extruder may be adjusted to change the ratio of magnetic material to non-magnetic material in the strands.

DETAILED DESCRIPTION

Magnetic material may be used in forming electronic devices, may be used in forming accessories such as covers, straps, and bags that are associated with electronic devices, may be used in forming fabric for electronic devices and accessories, may be used in forming fabric that is incorporated into seating, furniture, building structures, and other items, and/or may be used in forming other items. Configurations in which magnetic material is used in forming items based on one or more strands of magnetic material may sometime be described herein as an example. The strands of material may be monofilaments of material and/or may be multifilament strands such as strands of yarn. Strands may be processed by twisting, texturizing, or otherwise modifying or combining strands of material to form strand-based items. Strand-based items may be formed by weaving, knitting, or braiding strands of material to form different types of fabric.

Magnetic material may be magnetized to form permanent magnets. Permanent magnets may interact with each other. For example, permanent magnets may be arranged to attract each other or to repel each other. Soft magnetic materials can also be attracted by permanent magnets. Electromagnets may be electrically configured to either attract or repel a permanent magnet. Unmagnetized magnetic material (e.g., ferromagnetic material or ferrimagnetic material that has not been magnetized by application of an external magnetic field to form a permanent magnet) may also interact with permanent magnets and electromagnets. For example, a permanent magnet may attract a fabric or other structure formed from strands of unmagnetized magnetic material based on a rare earth alloy such as a neodymium alloy (e.g., NdFeB).

Figure 1:
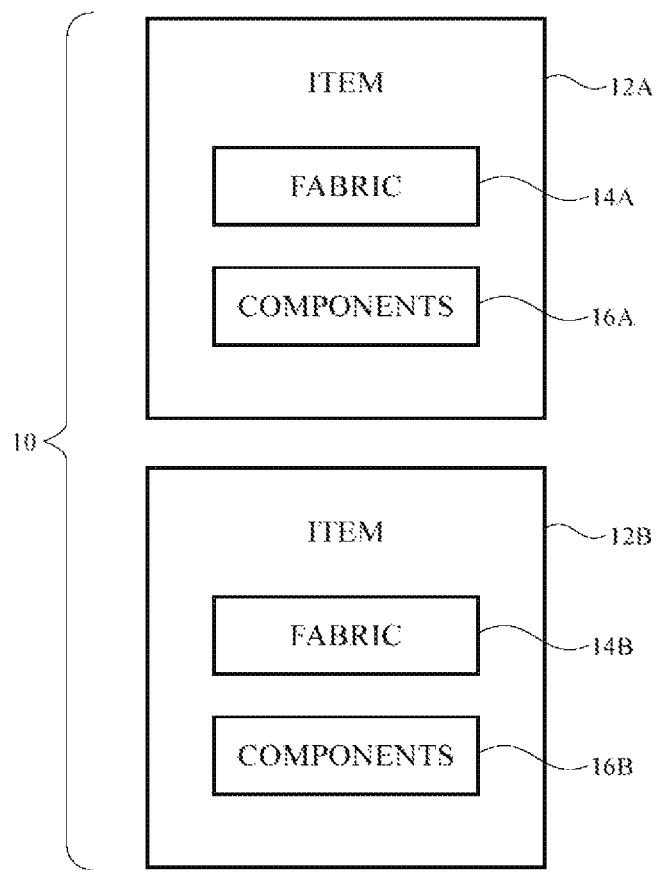
FIG. 1 is a schematic diagram of an illustrative system having one or more items with magnetic strands in accordance with an embodiment.

An illustrative system that includes items with magnetic structures (e.g., electromagnetics, permanent magnets, unmagnetized magnetic material, etc.) is shown in FIG. 1. As shown in FIG. 1, system 10 may include one or more items such as items 12A and 12B that include magnetic structures. Items such as items 12A and 12B may be electronic devices (e.g., cellular telephones, tablet computers, laptop computers, watches, pendant devices, other wearable devices, or other electronic equipment), may be parts of electronic devices or accessories for electronic devices (e.g., covers for portable electronic devices, straps for electronic devices, earphones, bags, covers, sleeves, or other structures that form part of electronic equipment or that are used in conjunction with electronic equipment), may be part of furniture, seating, clothing, a vehicle, a building, a kiosk, or any other items.

System 10 may include multiple parts that interact with each other (e.g., using magnetic forces). For example, system 10 may include a first item (e.g., item 12A) such as a portable electronic device and a second item (e.g., item 12B) such as a cover for the portable electronic device. In this type of scenario, items (structures) 12A and 12B are separable and are often referred to as forming different items. These components may also be used together as part of a unified system (i.e., a system formed from a device with a cover). If desired, system 10 may be a single item that is formed from multiple structures that interact with each other (e.g., using magnetic forces). For example, system 10 may be an item such as a fabric enclosure. In this type of arrangement, item 12A may form a main body portion of the enclosure and item 12B may form a flap for a pocket in the main body portion. Other configurations may also be used for system 10 (e.g., arrangements with more than three magnetically interacting items, etc.). The configuration of FIG. 1 is merely illustrative.

As shown in FIG. 1, items such as items 12A and 12B may include fabric such as fabric 14A and fabric 14B and may therefore sometimes be referred to as forming a fabric-based item or items. Fabric 14A and/or fabric 14B may include intertwined strands of material. Some or all of the strands in fabric 14A and/or 14B may be magnetic strands that include magnetic material such as rare-earth magnetic materials or other magnetic materials. Fabric 14A and 14B may also include dielectric strands (e.g., strands formed entirely from glass, plastic, or other dielectric), conductive strands (e.g., strands with magnetic or non-magnetic metal cores or coatings), and/or strands of other materials.

If desired, items 12A and 12B may include components 16A and 16B such as permanent magnets, electromagnets, structures formed from unmagnetized magnetic material, and non-magnetic components. During operation, magnetic structures in item 12A (e.g., permanent magnets, electromagnets, structures formed from unmagnetized magnetic material, magnetic strands, magnetic components, and other magnetic structures) may attract, may repel, may generate a magnetic field that is sensed using a magnetic sensor, may sense a magnetic field, or may otherwise interact with magnetic structures in item 12B (e.g., permanent magnets, electromagnets, structures formed from unmagnetized magnetic material, magnetic strands, magnetic components, and other magnetic structures).

If desired, components 16A and 16B may include circuitry. The circuitry of components 16A and 16B may include input-output devices such as buttons, touch sensors, light-based sensors such as light-based proximity sensors, force sensors, environmental sensors such as temperature sensors and humidity sensors, other sensors, status indicator lights and other light-based components such as light-emitting diodes for forming displays and other light-emitting structures, vibrators or other haptic output devices, etc. The circuitry of components 16A and 16B may also form control circuitry (e.g., processors, touch sensor circuits, etc.).

Fabric 14A and 14B may, if desired, include conductive strands of material that are coupled to control circuitry formed from processors and other circuits in components 16A and 16B, respectively. The conductive strands may serve as signal paths that carry signals between input-output components and control circuitry and may serve as capacitive touch sensor electrodes and other conductive structures in item 10. This is, however, merely illustrative. If desired, fabric 14A and fabric 14B may not include any conductive strands.

Figure 2:
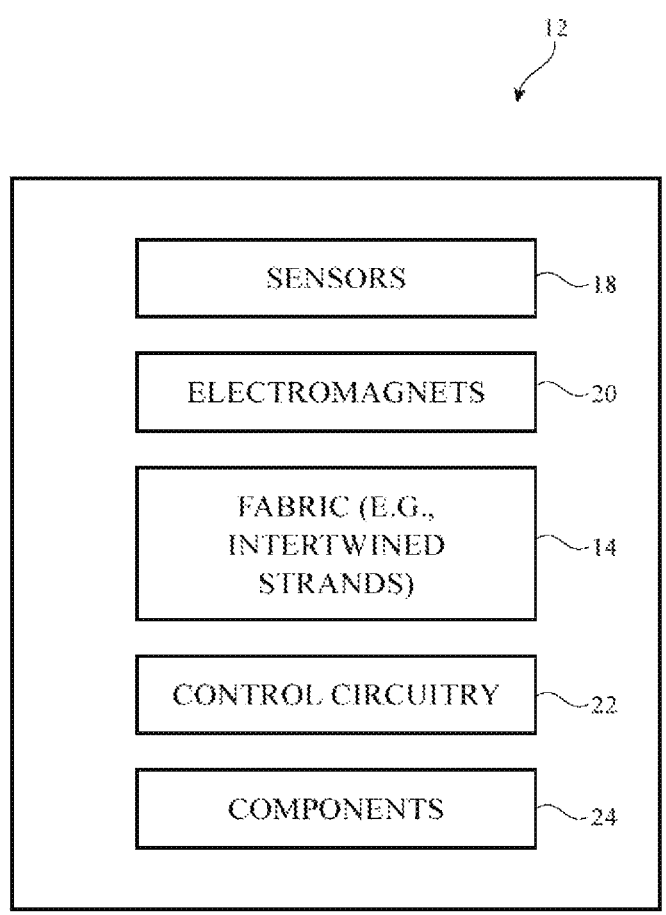
FIG. 2 is a schematic diagram of an illustrative item with magnetic strands in accordance with an embodiment.

FIG. 2 is a schematic diagram showing illustrative components that may be used in forming items such as item 12A and 12B of FIG. 1. As shown in FIG. 2, item 12 may include fabric 14 such as strands of magnetic material and/or other material. Magnetic material may also be used to form other structures in item 12.

Item 12 may include sensors 18. Sensors 18 may include magnetic sensors (e.g., Hall effect sensors, giant magnetoresistance sensors, or other sensors that measure magnetic fields). Sensors 18 may also include light-based sensors (e.g., light-based proximity sensors that emit light and detect reflected light, ambient light sensors that detect ambient light, image sensors, etc.), microphones, accelerometers and other sensors for detecting motion and position, temperature sensors, pressure sensors, strain gauges, touch sensors, and other sensors for detecting user input and for measuring environmental conditions.

Control circuitry 22 may include microprocessors, microcontrollers, digital signal processors, volatile and non-volatile memory and other storage, application-specific integrated circuits, and other circuitry for controlling the operation of item 12. Control circuitry 22 may use information from sensors 18, and other components 24 for controlling the operation of item 12.

Electromagnets 20 may be controlled by circuitry 22 to attract or repel magnetic structures. Electromagnets 20 may, for example, be used to open and close an enclosure along a seam, may be used to secure flaps or other foldable edge structures, may be used to close and open straps, etc.

Components 24 may include input-output devices such as switches, touch screens, displays, light-emitting diodes, speakers, vibrators, haptic output devices, motors, keyboards, track pads, pointing devices, peripheral components, and other devices for gathering input from a user or the environment surrounding item 12 while supplying output (e.g., output for a user or an item associated with item 12).

All or part of the components of item 12 of FIG. 2 may be incorporated into one or more items in system 10 (see, e.g., illustrative items 12A and 12B of FIG. 1). Items such as item 12 of FIG. 2 may include one or more fabric portions (see, e.g., fabric 14A and 14B of FIG. 1) and may therefore sometimes be referred to as strand-based items or fabric-based items. In other situations, some or all of a given item 12 may not include fabric. For example, a first item without fabric may interact with a second item that includes fabric.

Figure 3:
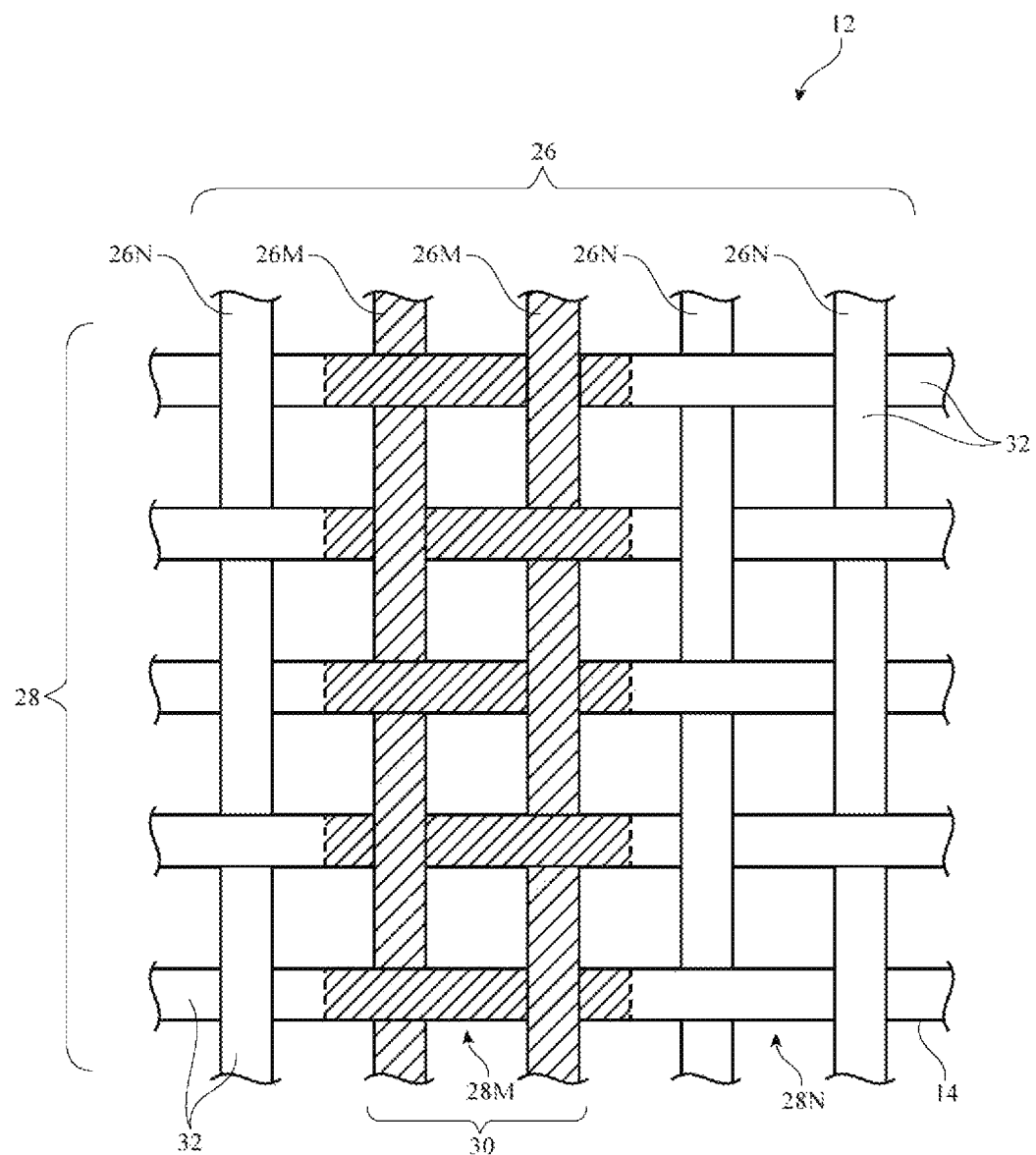
FIG. 3 is a diagram showing how magnetic strands may be used in fabric in accordance with an embodiment.

As shown in FIG. 3, item 12 may include fabric 14. Fabric 14 may be woven fabric, knit fabric, braided material, felt, or other suitable fabric formed from intertwined strands of material. In the illustrative arrangement of FIG. 3, fabric 14 is woven fabric that is formed from strands 32. Strands 32 may include warp strands 26 and weft strands 28. Strands 32 may include magnetic portions and non-magnetic portions. For example, warp strands 26 may include non-magnetic portions 26N and magnetic portions 26M. Weft strands 28 may include non-magnetic portions 28N and magnetic portions 28M. Magnetic portions 26M and 28M may extend throughout the entire length of the strand or may only be located in a portion of the strand. If desired, magnetic portions 26M and 28M of strands 32 may be located near one another to form a magnetic region such as magnetic region 30.

If desired, fabric 14 may also include conductive strands of material. Conductive strands in fabric 12 may be used in conveying signals between control circuitry 22 and electrical components 24 (see, e.g., FIG. 2).

Figure 4:
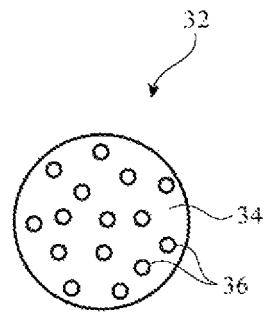
FIG. 4 is a cross-sectional view of an illustrative magnetic strand in accordance with an embodiment.
Figure 5:
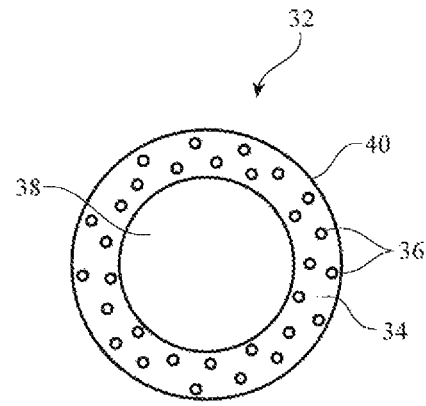
FIG. 5 is a cross-sectional side view of an illustrative magnetic strand that includes a non-magnetic core and a magnetic sheath in accordance with an embodiment.
Figure 6:
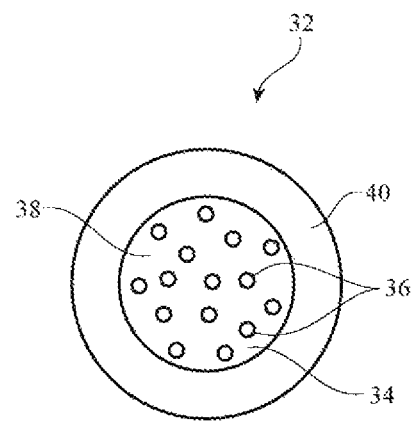
FIG. 6 is a cross-sectional side view of an illustrative magnetic strand that includes a magnetic core and a non-magnetic sheath in accordance with an embodiment.

FIGS. 4, 5, and 6 are cross-sectional side views of illustrative fibers (sometimes referred to as monofilaments) that may be used in forming magnetic yarn.

In the example of FIG. 4, magnetic strand 32 may include particles 36 of magnetic material (e.g., neodymium alloys or other rare-earth magnetic materials, non-rare-earth ferromagnetic or ferromagnetic magnetic materials, or other magnetic particles). Magnetic particles 36 may be hard magnets (e.g., with a particle size between 0.001 mm and 0.050 mm or other suitable size) or may be soft magnets (e.g., with a particle size between 20 nm and 0.050 mm or other suitable size). Hard magnetic materials retain their magnetism even after removal of an applied magnetic field. Soft magnetic materials are easily magnetized and demagnetized and may be used to form temporary magnets. A polymer blend such as polymer blend 34 (sometimes referred to as a polymer binder, a matrix, or supporting material) or other binder material may be used to support magnetic particles 36 (i.e., magnetic particles 36 may be embedded within blend 34). Examples of polymer materials that may be used to form blend 34 include polyamides (e.g., Nylon 6, Nylon 66, Nylon 12, etc.), polyester (polyethylene terephthalate (PET)), polyethylene, polypropylene, polyurethane, or other thermoplastic materials. Other polymers may be used, if desired. Strands of the type shown in FIG. 4 may sometimes be referred to as single component strands. A single component strand may be formed by extruding a single polymer (e.g., polymer 34 in which magnetic particles 36 are embedded) to form a filament.

In the example of FIG. 5, strand 32 has a core portion such as fiber core 38 and has an exterior layer such as exterior layer 40. Fiber core 38 may be a polymer core or other non-magnetic core and exterior layer 40 (sometimes referred to as a sheath) may be a layer of magnetic material (e.g., polymer 34 with embedded rare-earth alloy particles or other magnetic material particles 36).

In the example of FIG. 6, strand 32 includes a magnetic fiber core 38 and a non-magnetic outer layer 40. Fiber core 38 of FIG. 6 may include magnetic material particles 36 embedded in polymer 34. Exterior layer 40 may be a non-magnetic polymer layer. Strands of the type shown in FIGS. 5 and 6 may sometimes referred to as bicomponent strands. A bicomponent strand may be formed by extruding two polymers (e.g., a first polymer such as polymer 34 in which magnetic particles 36 are embedded and a second polymer such as polymer core 38 of FIG. 5 or polymer sheath 40 of FIG. 6) to form a filament. Examples of polymer materials that may be used to form core 38 and/or outer layer 40 include polyamides (e.g., Nylon 6, Nylon 66, Nylon 12, etc.), polyester (polyethylene terephthalate (PET)), polyethylene, polypropylene, polyurethane, or other thermoplastic materials, and any other suitable polymer.

If desired, strands 32 may include one or more additional layers of material (e.g., a central core, an outer coating, one or more intermediate layers interposed between the coating and the core, etc.). The layers of strands 32 may include one or more magnetic layers (e.g., layers of polymer blend containing embedded magnetic particles), may include solid magnetic alloy (e.g., rare-earth magnetic alloys such as neodymium alloys), may include dielectric (e.g., inorganic dielectric such as glass, oxides, nitrides, oxynitrides, etc.), organic dielectric such as polymers, ceramic, and/or other dielectric material, may include metal (e.g., non-magnetic metal), or other materials. Multilayer strand structures such as the structures forming strand 32 of FIGS. 5 and 6 may be used along the entire length of strands 32 or may be used along one or more discrete segments of strands 32.

Figure 7:
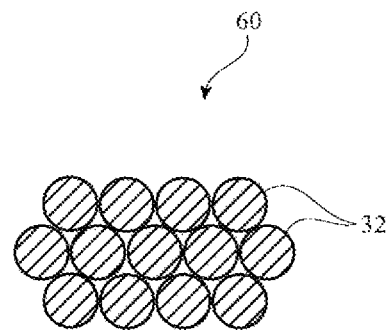
FIG. 7 is a cross-sectional side view of an illustrative yarn formed from multiple magnetic strands in accordance with an embodiment.
Figure 8:
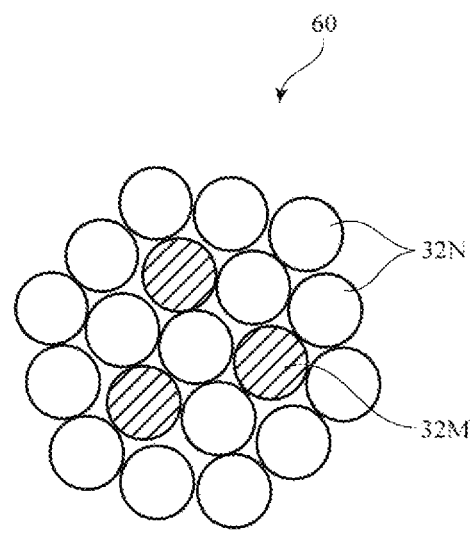
FIG. 8 is a cross-sectional side view of an illustrative yarn with magnetic and non-magnetic strands in accordance with an embodiment.

Monofilament strands such as strands 32 of FIGS. 4, 5, and 6 may be intertwined along their lengths to form multifilament strands (i.e., yarn). FIGS. 7 and 8 show examples of yarns that have been formed using magnetic strands. Strands 32 for yarn 60 may be intertwined by spinning, braiding, or by otherwise intertwining strands 32. In the example of FIG. 7, all of the strands 32 in yarn 60 are magnetic to form magnetic yarn 60.

In the example of FIG. 8, yarn 60 includes both magnetic strands 32M and non-magnetic strands 32N and may therefore be magnetic. Strands 32M and 32N may be spun together in a yarn spinning tool or may otherwise be intertwined to form yarn 60 (e.g., using braiding equipment, etc.).

Figure 9:
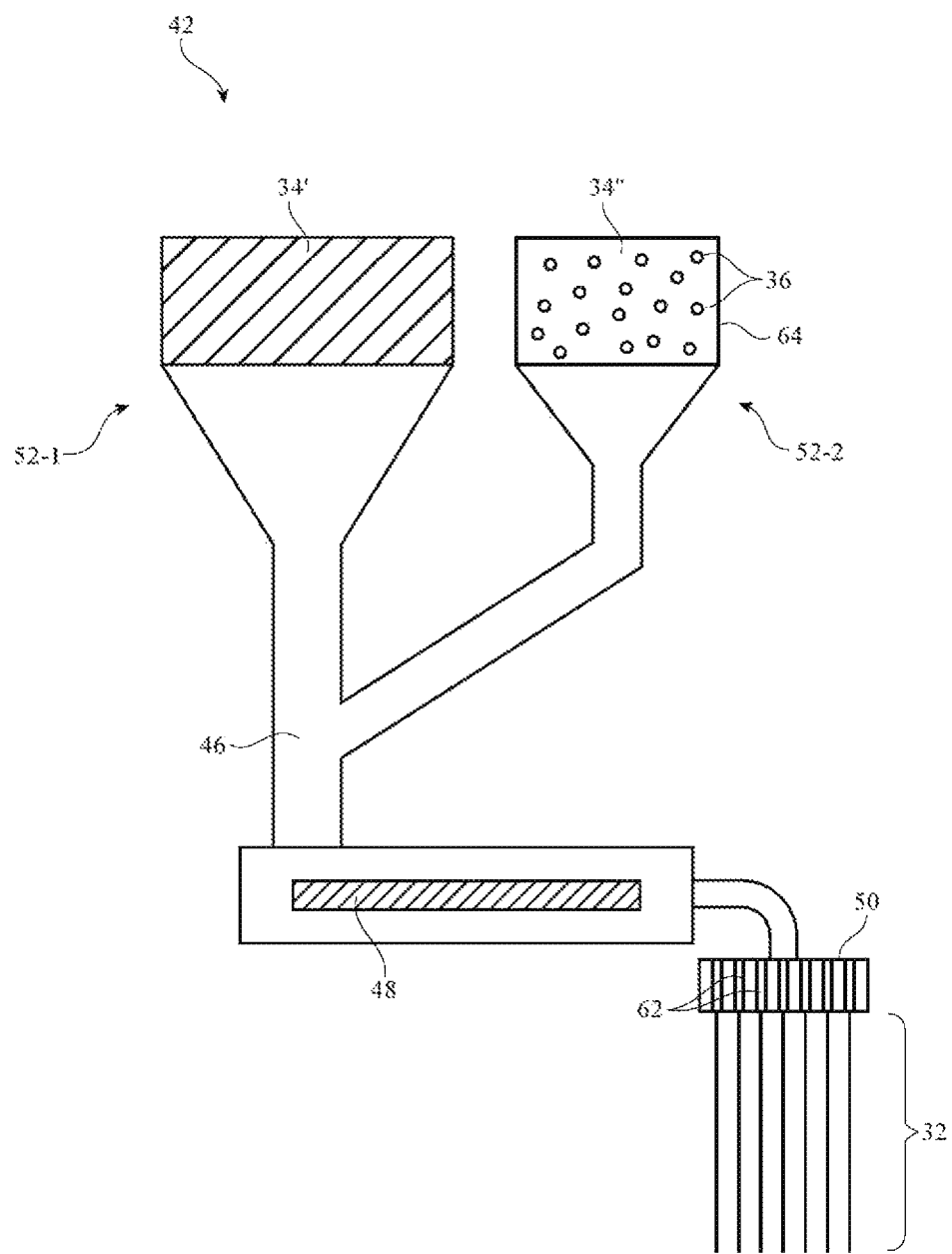
FIG. 9 is a diagram of illustrative extrusion equipment that may be used to form single component magnetic filaments in accordance with an embodiment.

Illustrative equipment that may be used in forming magnetic structures such as single component magnetic strands 32 of the type shown in FIG. 4 is shown in FIG. 9. As shown in the example of FIG. 9, strands 32 may be processed using extrusion equipment 42. Extrusion equipment 42 may include an extruder such as extruder 48 (e.g., a single screw or twin screw extruder) that pushes polymers through small holes in a spinneret such holes 62 in spinneret 50. As the polymer is pushed through spinneret 50, continuous polymer filaments 32 exit the array of openings 62.

Extrusion equipment 42 may form fibers 32 via melt spinning, which is sometimes described herein as an example. In arrangements where extrusion equipment 42 forms fibers 32 via melt spinning, the polymer that forms fibers 32 may be melted, extruded, and then solidified by cooling upon exiting spinneret 50.

Openings 62 in spinneret 50 may have a circular cross-sectional shape to produce strands 32 with circular cross-sectional shapes, or openings 62 may have any other suitable cross-sectional shape (oval, rectangular, trilobal, pentagonal, octagonal, etc.).

Polymers may be fed to extruder 48 via feed hoppers 52-1 and 52-2. Feed hopper 52-1 may feed base polymer 34' to extruder 48, and hopper 52-2 may feed magnet masterbatch 64 to extruder 48. Magnet masterbatch 64 may include magnetic particles 36 embedded in a polymer blend 34". Magnet masterbatch 64 may include, for example, about 20% magnetic particles by volume (or about 70% magnetic particles by weight), or may include any other suitable ratio of magnetic particles 36 to masterbatch polymer 34".

Base polymer 34' and magnet masterbatch 64 may be fed into a common feed path 46 before entering extruder 48. If desired, base polymer 34' and magnet masterbatch 64 may be solid or semi-solid in hoppers 52-1 and 52-2 and may be melted in extruder 48 by a heat source before reaching spinneret 50.

Strands 32 that exit spinneret 50 may be single component fibers of the type shown in FIG. 4. In particular, base polymer 34' and masterbatch polymer 34" may mix in feed path 46 and extruder 48 to form polymer blend 34 of FIG. 4. The polymer blend 34 may have magnetic particles 36 to form magnetic strands 32.

By feeding both non-magnetic base polymer 34' and magnet masterbatch 64 separately into feed path 46, extruding equipment 42 may control the ratio of magnet masterbatch 64 to base polymer 34'. If desired, extruding equipment 42 may change the ratio of magnet masterbatch 64 to non-magnetic base polymer 34' during the extrusion process to create strands 32 with varying amounts of magnetic particles 36 along the length of strands 32. The ratio of magnetic material 64 to non-magnetic material 34' may, for example, be adjusted by adjusting the rate at which feed hopper 52-2 feeds magnetic material 64 to extruder 48. Some portions of strands 32 may be formed entirely of non-magnetic base polymer 34' and may not include may magnetic particles 36 (e.g., by feeding only base polymer 34' to extruder 48 during the extrusion process). This is, however, merely illustrative. If desired, strands 32 may include uniform amounts of magnetic particles 36 relative to base polymer 34' along the length of strands 32.

If desired, magnetic strands 32 may be formed by extruding material from a single feed hopper. For example, magnetic material 64 may be fed to extruder 48 on its own (e.g., without base polymer 34'). Arrangements in which magnetic material 64 is extruded together with a base polymer such as base polymer 34' are sometimes described herein as an example.

After exiting spinneret 50, strands 32 may be processed further, if desired. For example, a stretching process may be used to stretch strands 32. Strands 32 may, for example, be stretched to achieve the desired monofilament diameter (e.g., 0.02 mm to 2.0 mm or other suitable diameter).

Figure 10:
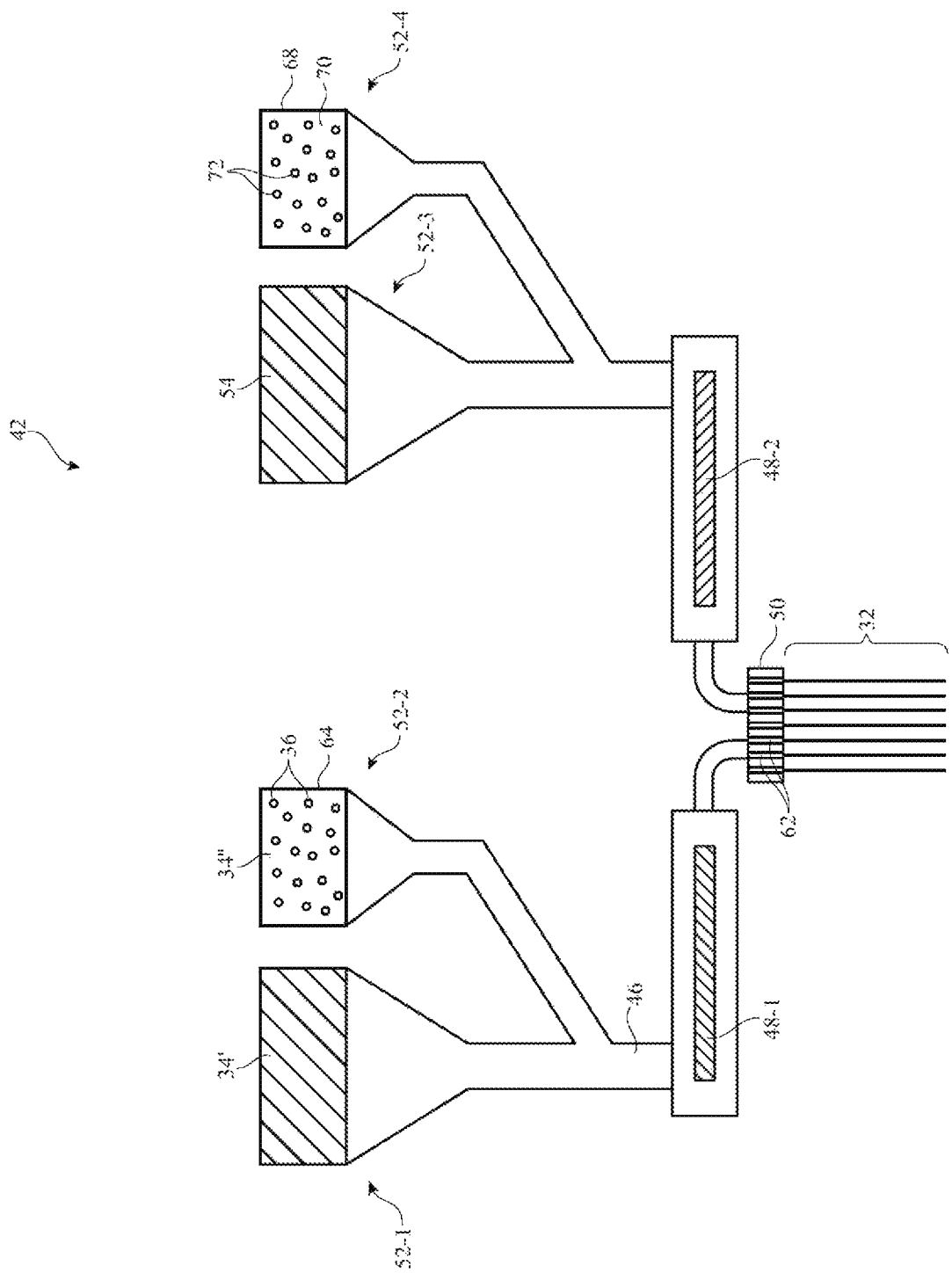
FIG. 10 is a diagram of illustrative extrusion equipment that may be used to form bicomponent magnetic filaments in accordance with an embodiment.

Illustrative equipment that may be used in forming magnetic structures such as bicomponent magnetic strands 32 of the type shown in FIGS. 5 and 6 is shown in FIG. 10. As shown in the example of FIG. 10, extrusion equipment 42 may include two extruders such as extruder 48-1 and extruder 48-2 (e.g., single screw or twin screw extruders) that push polymers through small holes in a spinneret such holes 62 in spinneret 50. As the polymers are pushed through spinneret 50, continuous, bicomponent polymer filaments 32 exit the array of openings 62.

Extruder 48-1 may be used to extrude the magnetic component of strands 32 (e.g., magnetic sheath 40 of FIG. 5, magnetic core 38 of FIG. 6, or other suitable magnetic component of strand 32). Extruder 48-2 may be used to extrude the non-magnetic component of strands 32 (e.g., non-magnetic core 38 of FIG. 5, non-magnetic sheath 40 of FIG. 6, or other suitable non-magnetic component of strands 32). The magnetic component of strands 32 may be formed by extruding polymers 34' and 34" (which contains magnetic particles 36) from feed hoppers 52-1 and 52-2, respectively, through extruder 48-1 and through a first set of openings 62 in spinneret 50. The non-magnetic component of strands 32 may be formed by extruding polymer 54 from feed hopper 52-3 through extruder 48-2 and through a second set of openings 62 in spinneret 50.

If desired, color may be imparted to strands 32 using a color masterbatch such as color masterbatch 68. Color masterbatch 68 may include a colored pigment such as pigment 72 that is mixed with a polymer such as polymer 70 (e.g., polyamide, polyester, polyethylene, polypropylene, polyurethane, etc.). Colored pigment 72 may be concentrated pigment that imparts color to surrounding polymer when melted and mixed with the surrounding polymer. If desired, a colored dye may be used instead of or in addition to pigment 72.

In the example of FIG. 10, feed hopper 52-4 feeds color masterbatch 68 to extruder 48-2, where it mixes with and imparts color to polymer 54. In arrangements where polymer 54 forms a sheath in strands 32, pigment 72 may impart color to the sheath of strands 32 by imparting color to polymer 54. In arrangements where magnetic material forms a sheath in strands 32, the magnetic material may, if desired, be imparted with color using a color masterbatch of the type shown in FIG. 10. In general, color may be imparted to any portion of strands 32 by incorporating pigments or dye from a color masterbatch in the polymer that forms that portion of strands 32. The example of FIG. 10 in which non-magnetic material 54 is colored is merely illustrative.

Openings 62 in spinneret 50 of FIG. 10 may be configured to produce bicomponent fibers of the type shown in FIGS. 5 and 6. In particular, openings 62 may include a central opening for producing a core such as core 38 of FIGS. 4 and 5 and a ring shaped opening surrounding the central opening for producing a sheath such as sheath 40 of FIGS. 4 and 5. This is, however, merely illustrative. If desired, openings 62 in spinneret 50 may have other configurations for producing other types of bicomponent fibers (e.g., side-by-side bicomponent fibers, core and sheath bicomponent fibers where the core is off-center, segmented pie bicomponent fibers, striped bicomponent fibers, trilobal bicomponent fibers, or any other suitable type or shape of bicomponent fiber).

As in the example of FIG. 9, by feeding both non-magnetic base polymer 34' and magnet masterbatch 64 separately into feed path 46, extruding equipment 42 of FIG. 10 may control the ratio of magnet masterbatch 64 to base polymer 34'. If desired, extruding equipment 42 may change the ratio of magnet masterbatch 64 to non-magnetic base polymer 34' during the extrusion process to create strands 32 with varying amounts of magnetic particles 36 along the length of strands 32. The ratio of magnetic material 64 to non-magnetic material 34' may, for example, be adjusted by adjusting the rate at which feed hopper 52-2 feeds magnetic material 64 to extruder 48-1. Some portions of strands 32 may be formed entirely of non-magnetic base polymer 34' and may not include may magnetic particles 36 (e.g., by feeding only base polymer 34' to extruder 48 during the extrusion process). This is, however, merely illustrative. If desired, strands 32 may include uniform amounts of magnetic particles 36 along the length of strands 32. Base polymer 34' and masterbatch polymer 34" may mix in feed path 46 and in extruder 48-1 to form polymer blend 34 (see, e.g., blend 34 of FIGS. 5 and 6). The polymer blend 34 may have magnetic particles 36 to form magnetic strands 32.

Strands 32 that exit spinneret 50 may be bicomponent fibers of the type shown in FIGS. 5 and 6 or may be any other suitable type of bicomponent fiber having a magnetic component. The example of FIG. 10 in which a first component in strands 32 (e.g., the component formed from polymers 34' and 34" in extruder 48-1) is magnetic and a second component in strands 32 (e.g., the component formed from polymer 54 in extruder 48-2) is non-magnetic is merely illustrative. If desired, both components in bicomponent strands 32 of FIG. 10 may be magnetic (e.g., by including magnetic particles in polymer 54 or by feeding a second magnet masterbatch into extruder 48-2 with polymer 54). Arrangements where more than two extruders are used to produce strands with more than two components may also be used, if desired.

The examples of FIGS. 9 and 10 in which magnetic strands are formed by mixing a magnet masterbatch and feeding the magnet masterbatch with a base polymer into an extruder is merely illustrative. If desired, magnetic strands may be formed by extruding polymer with magnetic particles from a single feed hopper. The use of a magnet masterbatch and base polymer may help ensure that the resulting strands 32 have the desired flexibility and robustness. It also allows equipment 42 to modulate the ratio of magnetic particles to polymer in strands 32.

Figure 11:
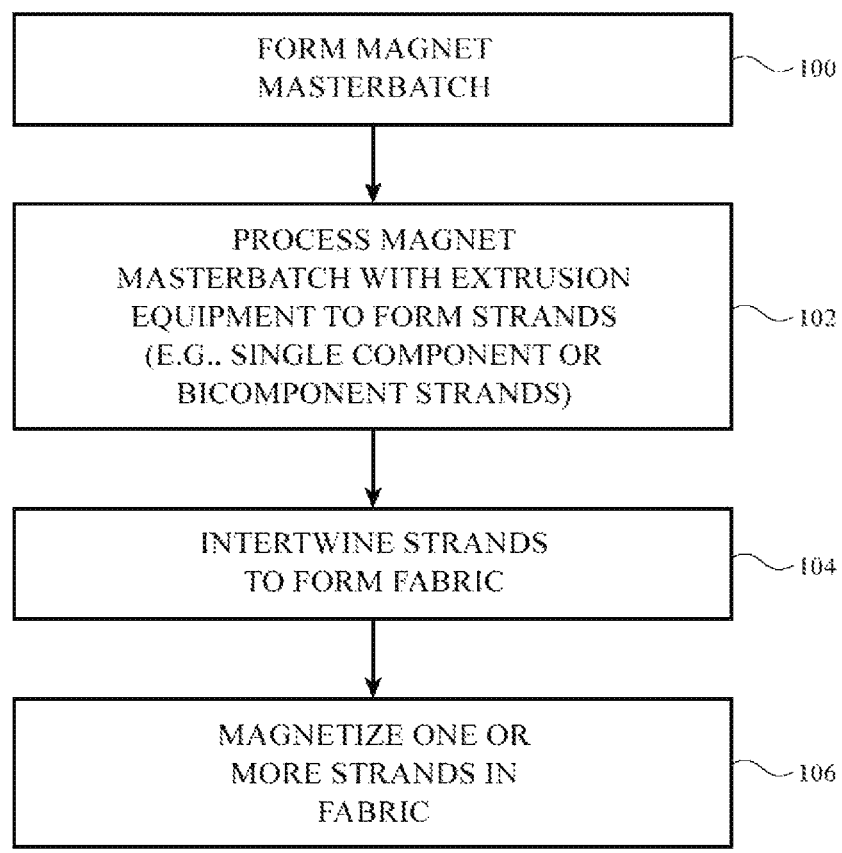
FIG. 11 is a flow chart of illustrative steps involved in forming fabric with one or more magnetic strands in accordance with an embodiment.

FIG. 11 is a flow chart of illustrative steps involved in forming an item with magnetic strands of the type shown in FIGS. 1-8.

At step 100, a magnet masterbatch such as magnet masterbatch 64 of FIG. 9 or FIG. 10 may be mixed. The magnet masterbatch may contain a desired ratio of magnetic particles 36 to polymer blend 34". The ratio of magnetic particles to polymer (by volume) may be 1 to 5, 1 to 10, 3 to 10, 4 to 10, or other suitable ratio.

At step 102, the magnet masterbatch may be processed using extrusion equipment 42 of the type shown in FIG. 9 or FIG. 10. To produce single component magnetic strands, polymers including the magnet masterbatch and a base polymer may be extruded through a single extruder and pushed through an array of openings in a spinneret to produce single component magnetic strands 32. To produce bicomponent magnetic strands, polymers including the magnet masterbatch and a base polymer may be extruded through a first extruder, while an additional polymer may be extruded through a second extruder. Each extruder may respectively push the first and second components through a respective set of openings in a spinneret to produce bicomponent magnetic strands. The bicomponent magnetic strands may be core-and-sheath bicomponent fibers or may be any other suitable configuration depending on the cross-sectional shape of the spinneret openings.

At step 104, strands 32 may be intertwined to form fabric (e.g., fabric 14 of FIGS. 1, 2, and 3). Step 104 may include weaving, knitting, warp knitting, braiding, or any other suitable method of intertwining strands to form fabric.

At optional step 106, magnetizing equipment may be used to magnetize magnetic material in strands 32. Step 106 may be performed before step 104 so that the magnetic material in strands 32 is magnetized before being incorporated into fabric 14 or step 106 may be performed after step 104 so that strands 32 are magnetized after being incorporated into fabric 14. Once magnetized, the magnetic material can form a permanent magnet. The permanent magnet may be sensed by a magnetic sensor, may interact with another permanent magnet or other magnetic structure to form part of a clasp or closure, or may be used in forming other structures for item 12. Following the formation of the fabric, magnetizing equipment e.g., a permanent magnet or electromagnet) may apply a magnetic field that is sufficient to magnetize all of a fabric or fabric-based item, a portion of the fabric or fabric-based item, or any other portion of a strand-based item).

The foregoing is merely illustrative and various modifications can be made by those skilled in the art without departing from the scope and spirit of the described embodiments. The foregoing embodiments may be implemented individually or in any combination.

What is claimed is:

1. A method for forming fabric, comprising:
    with a first feed hopper, feeding a magnet masterbatch to a feed path, wherein the magnet masterbatch includes magnetic particles in a polymer material;
    with a second feed hopper, feeding a base polymer to the feed path, wherein the base polymer mixes with the magnet masterbatch in the feed path;
    with the extruder, receiving a mix of the magnet masterbatch and the base polymer from the feed path and extruding the mix of the magnet masterbatch and the base polymer through an array of openings to produce magnetic strands;
    with the first feed hopper, adjusting a ratio of the magnet masterbatch to the base polymer so that the ratio varies along a length of the magnetic strands; and
    intertwining the magnetic strands.

2. The method defined in claim 1 wherein the magnetic particles comprise rare-earth magnetic particles.

3. The method defined in claim 2 wherein the rare-earth magnetic particles comprise neodymium alloy particles.

4. The method defined in claim 1 wherein the base polymer comprises a material selected from the group consisting of: polyamide, polyester, polyethylene, polypropylene, and polyurethane.

5. The method defined in claim 1 wherein the polymer material comprises a material selected from the group consisting of: polyamide, polyester, polyethylene, polypropylene, and polyurethane.

6. The method defined in claim 1 wherein intertwining the magnetic strands comprises intertwining the magnetic strands with non-magnetic strands, wherein the magnetic strands form a magnetic portion of the fabric.

7. The method defined in claim 1 wherein the magnetic strands have at least one non-magnetic segment that is formed entirely of the base polymer.

8. The method defined in claim 1 wherein the magnetic strands comprise single component magnetic strands.

9. The method defined in claim 1 further comprising:
    with a third feed hopper, feeding an additional polymer to an additional extruder; and
    with the additional extruder, pushing the additional polymer through the array of openings to produce the magnetic strands.

10. The method defined in claim 9 wherein the magnetic strands comprise bicomponent magnetic strands.

11. The method defined in claim 10 wherein a first component of the bicomponent magnetic strands comprises the magnet masterbatch and the base polymer and wherein a second component of the bicomponent magnetic strands comprises the additional polymer.

12. The method defined in claim 11 wherein the additional polymer forms a core in the bicomponent magnetic strands and the magnet masterbatch and the base polymer form a sheath in the bicomponent magnetic strands.

13. The method defined in claim 11 wherein the magnet masterbatch and the base polymer form a core in the bicomponent magnetic strands and the additional polymer forms a sheath in the bicomponent magnetic strands.

14. A method for forming strands for fabric, comprising:
    with first and second feed hoppers, feeding first and second polymers to a common feed path, wherein the second polymer contains magnetic particles and wherein the first and second polymers mix in the common feed path to produce a magnetic material;
    with a first extruder, receiving the magnetic material from the common feed path and extruding the magnetic material through a first set of openings in a spinneret to form a first component in a magnetic strand;
    with a second extruder, extruding non-magnetic material through a second set of openings in the spinneret to form a second component in the magnetic strand; and
    intertwining the magnetic strand with other strands, wherein the magnetic strand has a non-magnetic segment in which a cross-section of the magnetic strand is comprised entirely of the non-magnetic material.

15. The method defined in claim 14 wherein the first component forms a core in the magnetic strand and the second component forms a sheath in the magnetic strand.

16. The method defined in claim 14 wherein the second component forms a core and the first component forms a sheath in the magnetic strand.

17. A method for forming magnetic strands, comprising:
- with a first feed hopper, feeding a first polymer to a first extruder;
- with a second feed hopper, feeding a second polymer to the first extruder, wherein the second polymer is mixed with magnetic particles and wherein the first polymer, the second polymer, and the magnetic particles are mixed together in a common feed path before being fed to the first extruder;
- with a third feed hopper, feeding a third polymer to a second extruder; and
- with the first and second extruders, pushing the first, second, and third polymers through a spinneret to form bicomponent magnetic strands, wherein an amount of the magnetic particles in one of the bicomponent magnetic strands varies along its length.

18. The method defined in claim 17 wherein the magnetic particles comprise rare-earth magnetic particles.

19. The method defined in claim 18 wherein the first, second, and third polymers are selected from the group consisting of: polyamide, polyester, polyethylene, polypropylene, and polyurethane.

* * * * *